United States Patent
Oh

(10) Patent No.: US 12,267,514 B2
(45) Date of Patent: Apr. 1, 2025

(54) VIDEO DECODING APPARATUS AND METHOD

(71) Applicant: Samsung Electronics Co., Ltd., Suwon-si (KR)

(72) Inventor: Hwayong Oh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 419 days.

(21) Appl. No.: 17/721,707

(22) Filed: Apr. 15, 2022

(65) Prior Publication Data

US 2023/0040891 A1    Feb. 9, 2023

(30) Foreign Application Priority Data

Aug. 3, 2021    (KR) .................. 10-2021-0102017

(51) Int. Cl.
| | |
|---|---|
| *H04N 19/44* | (2014.01) |
| *G06F 9/50* | (2006.01) |
| *H04N 19/15* | (2014.01) |
| *H04N 19/184* | (2014.01) |
| *H04N 19/42* | (2014.01) |

(52) U.S. Cl.
CPC .......... *H04N 19/44* (2014.11); *G06F 9/5027* (2013.01); *H04N 19/15* (2014.11); *H04N 19/184* (2014.11); *H04N 19/42* (2014.11)

(58) Field of Classification Search
CPC ...... H04N 19/44; H04N 19/15; H04N 19/184; H04N 19/42; H04N 19/433; H04N 19/70; H04N 19/423; G06F 9/5027
USPC ....................................................... 382/233
See application file for complete search history.

(56) References Cited

U.S. PATENT DOCUMENTS

| | | | |
|---|---|---|---|
| 9,031,138 B1 * | 5/2015 | Lewis ................ | H04N 19/70 375/240.26 |
| 9,621,906 B2 | 4/2017 | Hendry et al. | |
| 9,812,095 B2 | 11/2017 | Jeon et al. | |
| 10,165,291 B2 | 12/2018 | Hugosson et al. | |
| 11,350,117 B2 * | 5/2022 | Zhou ................... | H04N 19/521 |
| 2009/0310686 A1 | 12/2009 | Kee | |
| 2010/0220793 A1 * | 9/2010 | Jang .................... | H04N 19/46 375/E7.026 |
| 2011/0280307 A1 * | 11/2011 | MacInnis ........... | H04N 5/44504 375/240.15 |
| 2015/0117516 A1 * | 4/2015 | Bracha ................ | H04N 19/109 375/240.02 |
| 2018/0054633 A1 | 2/2018 | Okada et al. | |

(Continued)

FOREIGN PATENT DOCUMENTS

JP    2003-009147 A    1/2003

*Primary Examiner* — Ali Bayat
(74) *Attorney, Agent, or Firm* — Harness, Dickey & Pierce, P.L.C.

(57) ABSTRACT

According to an example embodiment, a video decoding apparatus may be provided. The video decoding apparatus may include a central processing unit (CPU) configured to parse first header data included in an input bit-stream and generate a first register set based on the parsed first header data; and a decoder configured to decode the input bit-stream based on input parameters obtained through the first register set, wherein CPU is configured to parse second header data included in a second bit-stream of the input bit-stream of a second frame subsequent to the first frame while the decoder decodes a first bit-stream corresponding to the first frame.

20 Claims, 9 Drawing Sheets

(56) References Cited

U.S. PATENT DOCUMENTS

2019/0057767 A1 2/2019 Wilson
2020/0244974 A1* 7/2020 Lim .................... H04N 19/196

* cited by examiner

VIDEO DECODING APPARATUS AND METHOD

CROSS-REFERENCE TO RELATED APPLICATION

This application is based on and claims priority under 35 U.S.C. § 119 to Korean Patent Application No. 10-2021-0102017, filed on Aug. 3, 2021, in the Korean Intellectual Property Office, the disclosure of which is incorporated by reference herein in its entirety.

BACKGROUND

Various example embodiments according to the inventive concepts relate to a video decoding apparatus and/or method.

A video decoding apparatus and method are utilized in various technical fields related to image processing. For example, restoring an image data from a digital signal.

SUMMARY

Video decoding may be divided into a firmware operation performed by a central processing unit (CPU) such as a reduced instruction set computer (RISC) and a hardware operation performed by a decoder, and the hardware operation depends on the performance of the decoder itself. Therefore, when the same decoder is used in video decoding, it may be required to reduce the time for the firmware operation in order to reduce the total video decoding time.

However, the firmware operation of parsing header data included in a bit-stream and controlling the operation of the decoder may not significantly reduce the basic processing time even if the performance of the RISC is increased. Further, the format of header data of the input bit-stream may vary depending on the type of video codec applied to the decoder, and the firmware operation time may vary depending on the type of the input bit-stream.

As described above, in situations where there is a limit to reducing the firmware operation time itself, a method of further improving the additional performance of the video decoding system may be required. Various example embodiments provide a video decoding apparatus and method capable of reducing total decoding time. The technical problems to be solved by the inventive concepts are not limited to the technical problems as described above, and other technical problems may be inferred from the following example embodiments.

A video decoding apparatus according to an aspect of the inventive concepts may include a CPU configured to parse first header data included in a first bit stream of an input bit-stream and generate a first register set based on the parsed first header data; and a decoder configured to decode the first bit-stream based on input parameters obtained through the first register set, wherein the CPU is configured to parse second header data included in a second bit-stream of the input bit-stream of a second frame subsequent to the first frame while the decoder decodes a first bit-stream corresponding to the first frame.

A video decoding apparatus according to another aspect of the inventive concepts may include while decoding a first bit-stream corresponding to a first frame including a first header data, parsing second header data included in a second bit-stream corresponding to a second frame subsequent to the first frame; generating and storing a register set corresponding to the second frame in advance based on a result of parsing second header data included in the second bit-stream; and starting decoding of the second bit-stream based on a second register set corresponding to the second frame when decoding of the first bit-stream is completed.

A video decoding apparatus according to another aspect of the inventive concepts may include a decoder configured to decode a first bit-stream; a CPU configured to parse header data included in a second bit-stream; and a plurality of bit-stream readers configured to provide the first bit-stream and the second bit-stream to the decoder and the CPU, respectively, such that decoding of the first bit-stream and parsing of header data included in the second bit-stream may be performed in parallel.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EXAMPLE EMBODIMENTS

Figure 1:
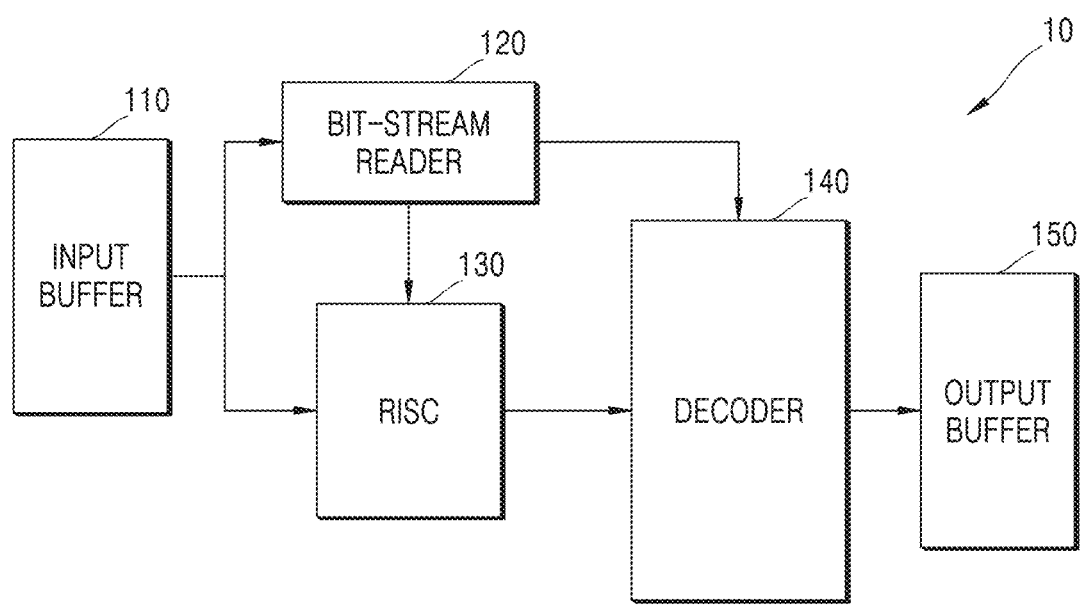
FIGS. 1 to 3 are diagrams for explaining a video decoding apparatus according to the related art.

Hereinafter, example embodiments of the inventive concepts are described in detail with reference to the accompanying drawings. The example embodiments of the inventive concepts are provided to more completely explain the inventive concepts to those of ordinary skill in the art. Because the inventive concepts may be various modifications and take various forms, specific example embodiments are illustrated in the drawings and described in detail. However, this is not intended to limit the inventive concepts to a specific form of disclosure, and it should be understood to include all modifications, equivalents and substitutes included in the idea and scope of the inventive concepts. In describing each figure, similar reference numerals are used for similar components. In the accompanying drawings, the dimensions of the structures are enlarged or reduced than the actual size for clarity of the inventive concepts.

Terms such as "consisting" or "including" used in the present example embodiments should not be construed as necessarily including all of the various components or various steps described in the specification, and it should be construed that some components or some steps may not be included or may further include additional components or steps.

Also, as used herein, terms including ordinal numbers such as 'first' or 'second' may be used to describe various components, but the above components should not be limited by the above terms. The above terms may be used for the purpose of distinguishing one component from another.

Figure 2:
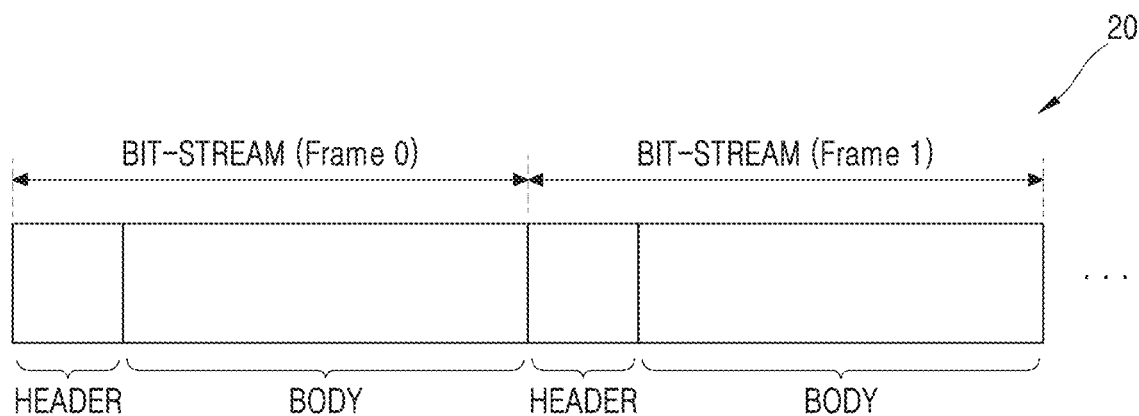
Figure 3:
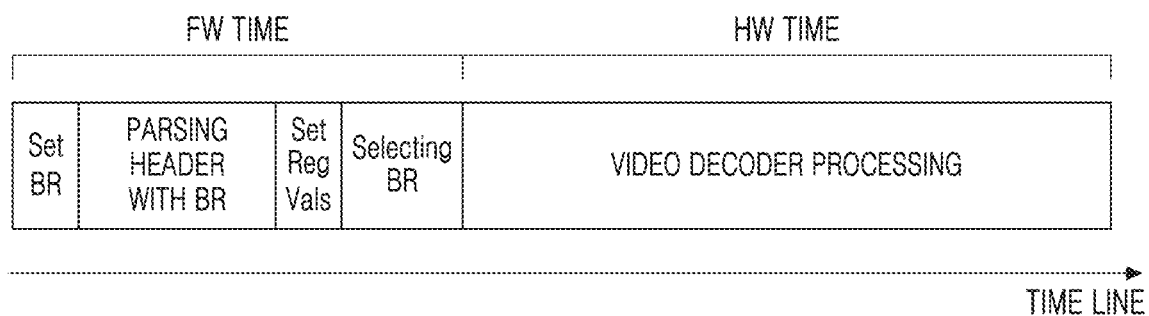

FIGS. 1 to 3 are diagrams for describing a video decoding apparatus according to the related art.

Referring to FIG. 1, a video decoding apparatus 10 according to the related art includes an input buffer 110, a bit-stream reader 120, a reduced instruction set computer (RISC) 130, a decoder 140, and an output buffer 150.

The input buffer 110 may receive an input bit-stream from the outside and store the received input bit-stream. In one example, the input bit-stream may correspond to an image sequence comprising a plurality of frames. The bit-stream reader 120 may read the input bit-stream stored in the input buffer 110 in units of bits and may provide the read bit-stream to the RISC 130 or the decoder 140.

The RISC 130 may check whether the input bit-stream is prepared in the input buffer 110. When the input bit-stream is prepared in the input buffer 110, the RISC 130 may receive a bit-stream from the input buffer 110 in units of frames. For example, the RISC 130 may receive a bit-stream corresponding to one frame in one cycle.

Referring to FIG. 2, an example of an input bit-stream 20 is shown. As shown in FIG. 2, the input bit-stream 20 may include a bit-stream corresponding to the first frame (Frame 0) and a bit-stream corresponding to the second frame (Frame 1). Although omitted in FIG. 2, the input bit-stream 20 may also include bit-streams corresponding to the remaining frames. On the other hand, the bit-stream corresponding to one frame may be divided into header data and body data. The header data may include control information (e.g., input parameters) necessary for the decoder 140 to decode the bit-stream, and the body data may include actual compressed image data (e.g., compressed images and associated data). The body data may also be referred to as a payload.

The image sequence may include a plurality of consecutive pictures or frames, and a picture or frame displayed on one screen may include a plurality of slices. The header data may include parameters associated with control information in units of pictures and slices as well as parameters that define overall characteristics of the image sequence. For example, the header data may include various parameters such as the maximum frame number, picture order, resolution of decoded pictures, color and depth of pictures, various tools used for decoding, and the like.

The RISC 130 may parse the header data included in the bit-stream corresponding to a current frame. The RISC 130 may generate a register set necessary for the decoder 140 to decode a bit-stream corresponding to the current frame based on the parsed header data and may set the register set in the decoder 140. The decoder 140 may receive the bit-stream corresponding to the current frame from the bit-stream reader 120 and perform decoding on the bit-stream under the control of the RISC 130. The image data decoded by the decoder 140 may be stored in the output buffer 150.

Referring to FIG. 3, a process in which the video decoding apparatus 10 performs decoding on one frame is illustrated along a timeline.

In FIG. 3, "Set BR" may refer to a process in which the RISC 130 sets the bit-stream reader 120 to receive a bit-stream corresponding to one frame from the input buffer 110. "Parsing Header with BR" may refer to a process in which the RISC 130 parses header data included in the bit-stream as the bit-stream corresponding to one frame is transmitted through the bit-stream reader 120. "Set RegVals" refers to a process in which the RISC 130 generates a register set necessary for the decoder 140 to decode the bit-stream based on the header data and sets the register set in the decoder 140, and "Selecting BR" may refer to a process in which the RISC 130 sets the bit-stream reader 120 to transmit the bit-stream to the decoder 140. In addition, "Video Decoder Processing" may refer to a process in which the decoder 140 decodes a bit-stream corresponding to one frame.

As such, video decoding may be divided into a firmware operation performed by the RISC 130 and a hardware operation performed by the decoder 140. Also, as shown in FIG. 3, the decoding time for one frame may correspond to the sum of the firmware operating time (FW Time) and the hardware operating time (HW Time). On the other hand, the hardware operation depends on the performance of the decoder 140 itself. Therefore, in order to reduce the total video decoding time in a situation in which the same decoder 140 is used, it may be required to reduce the firmware operation time (FW time).

However, the firmware operation of parsing header data included in the bit-stream and controlling the operation of the decoder 140 may not significantly reduce the basic processing time even if the performance of the RISC 130 is increased. Further, the format of header data of the input bit-stream may vary depending on the type of video codec applied to the decoder 140, and the firmware operation time may vary depending on the type of the input bit-stream.

As described above, in situations where there is a limit to reducing the firmware operation time itself, a method of further improving the additional performance of the video decoding system may be required. Hereinafter, a video coding apparatus and method for reducing the total video decoding time are described in detail with reference to FIGS. 4 to 9.

Figure 4:
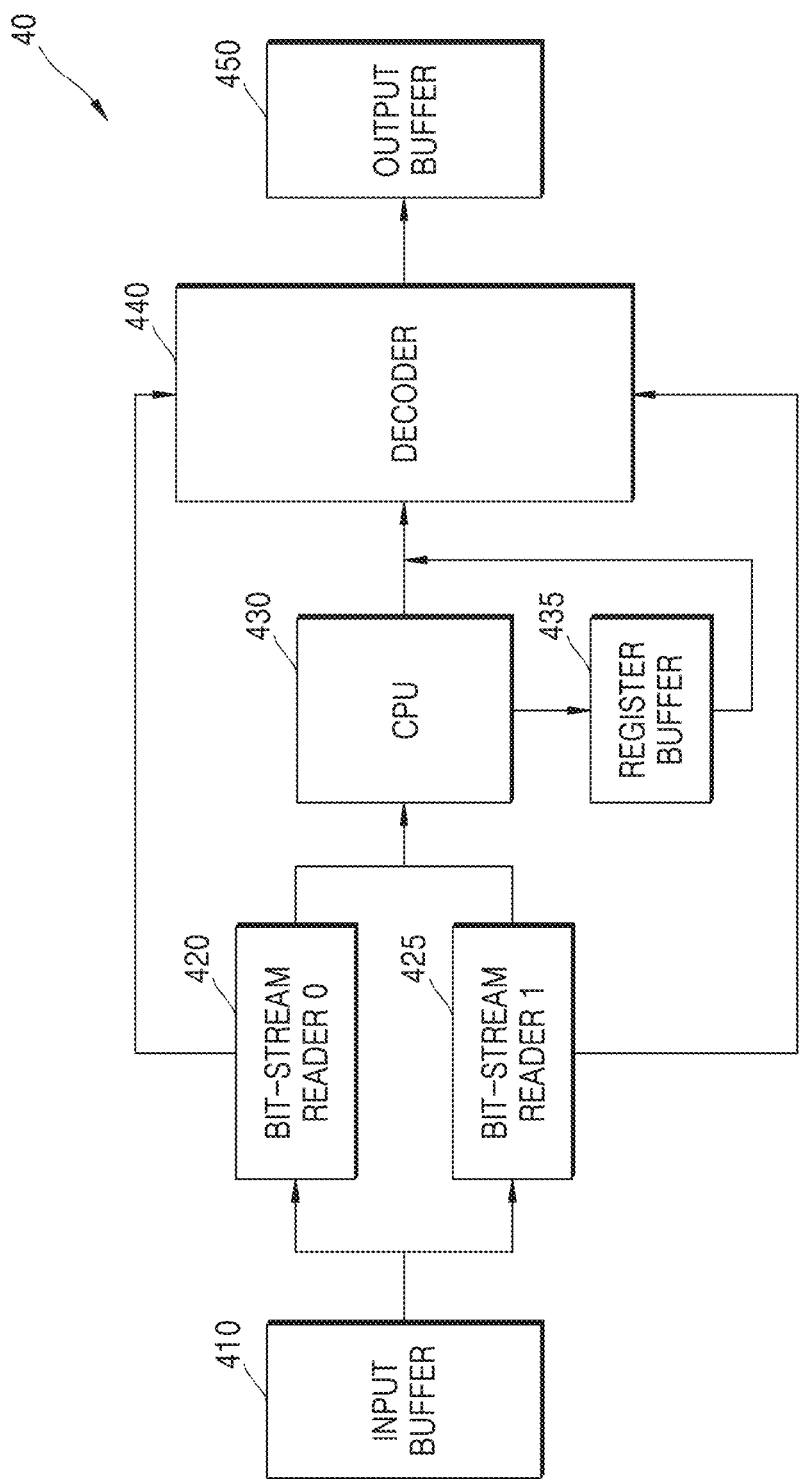
FIG. 4 is a block diagram illustrating a configuration of a video decoding apparatus according to an example embodiment.

FIG. 4 is a block diagram illustrating a configuration of a video decoding apparatus according to an example embodiment.

Referring to FIG. 4, a video decoding apparatus 40 according to an example embodiment of the inventive concepts may include an input buffer 410, a first bit-stream reader 420, a second bit-stream reader 425, a central processing unit (CPU) 430, a register buffer 435, a decoder 440, and an output buffer 450. However, this is not necessarily limited thereto, and the video decoding apparatus 40 may further include other components in addition to the components shown in FIG. 4. In addition, in the video decoding apparatus 40 shown in FIG. 4, some components (e.g., the input buffer 410 and the output buffer 450) may be omitted.

The input buffer 410 may receive an input bit-stream from the outside and store the received input bit-stream. In one example, the input bit-stream may correspond to an image sequence including a plurality of frames. The input buffer 410 may provide the input bit-stream to the CPU 430 through at least one of the first bit-stream reader 420 and the second bit-stream reader 425.

The input buffer 410 may include a frame descriptor so that the CPU 430 may read the input bit-stream in units of frames. For example, the input buffer 410 may obtain in advance at least two or more pieces of information among a start position, a size, and an end position of each of the bit-streams divided in frame units, and such information may be referred to as a frame descriptor. The CPU 430 may load the start position of the bit-stream in units of frames from the input buffer 410 with reference to the frame descriptor and may set the loaded bit-stream to at least one of the first bit-stream reader 420 and the second bit-stream reader 425.

The first bit-stream reader 420 and the second bit-stream reader 425 may read the input bit-stream stored in the input buffer 410 in units of bits and provide the read input bit-stream to the CPU 430 or the decoder 440. For example, the first bit-stream reader 420 may read the first bit-stream in units of bits and provide the read first bit-stream to the decoder 440, and the second bit-stream reader 425 may read the second bit-stream in units of bits and provide the read second bit-stream to the CPU 430.

The first bit-stream and the second bit-stream may correspond to each of the adjacent frames. In one example, in a current cycle in which decoding of a current frame is performed, the first bit-stream reader 420 may provide the first bit-stream corresponding to the current frame (first frame) to the decoder 440, and the second bit-stream reader 425 may provide the second bit-stream corresponding to the next frame (second frame) to the CPU 430. However, this is only an example, and the first bit-stream reader 420 may provide the second bit-stream to the CPU 430, and the second bit-stream reader 425 may provide the first bit-stream to the decoder 440.

In a second cycle (e.g., a previous cycle) before the first cycle (e.g., a current cycle) in which the first bit-stream reader 420 provides the first bit-stream to the decoder 440, the first bit-stream reader 420 may have provided the first bit-stream to the CPU 430. Further, in a third cycle (e.g., a next cycle) following the first cycle (e.g., the current cycle) in which the first bit-stream reader 420 provides the first bit-stream to the decoder 440, the second bit-stream reader 425 may provide a second bit-stream corresponding to the next frame to the decoder 440, and the first bit-stream reader 420 may provide a third bit-stream corresponding to a frame (third frame) subsequent to the next frame to the CPU 430. As such, each of the first bit-stream reader 420 and the second bit-stream reader 425 may alternately provide bit-streams to the CPU 430 or the decoder 440. Those of ordinary skill in the art readily understand that terms such as "current", "previous" and "next" may be relative depending on when the terms are used.

The CPU 430 may overall control the video decoding apparatus 40 or the decoder 440. The CPU 430 may control operations of components included in the video decoding apparatus 40. However, the CPU 430 is not limited thereto, and the CPU 430 may be a dedicated processor for controlling the decoder 440. In this case, the video decoding apparatus 40 may separately include a main CPU (not shown) that generally controls the video decoding apparatus 40.

The CPU 430 may be implemented as an array of a plurality of logic gates or may be implemented as a combination of a general-purpose microprocessor and a memory in which a program executable by the microprocessor is stored. The CPU 430 may be a RISC that drives firmware. For example, the CPU 430 may be an advanced RISC machines (ARM) processor and may control the decoder 440 and the like depending on firmware code stored in the memory. However, the CPU 430 is not necessarily limited thereto, and the CPU 430 may be a complex instruction set computer (CISC). In other words, the CPU 430 is not limited by its architecture.

The CPU 430 may parse header data included in the input bit-stream and generate a register set based on the parsed header data. The decoder 440 may decode the input bit-stream depending on the control of the CPU 430. For example, the decoder 440 may decode the input bit-stream based on input parameters obtained through the register set generated by the CPU 430.

While the decoder 440 decodes the first bit-stream corresponding to the current frame, the CPU 430 may parse header data included in the second bit-stream corresponding to the next frame The CPU 430 performs a firmware operation, and the decoder 440 performs a hardware operation, and the CPU 430 and the decoder 440 may operate independently of each other. The video decoding apparatus 40 according to the inventive concepts may perform decoding on the first bit-stream and parsing on header data included in the second bit-stream in parallel by using that the CPU 430 and the decoder 440 may operate in parallel in units of frames.

Accordingly, there is the same effect that the time for the firmware operation is omitted in the remaining frames except for the first frame of the image sequence, so that the processing time per frame and total video decoding time may be reduced.

In order for the CPU 430 and the decoder 440 to operate in parallel, a plurality of bit-stream readers (e.g., the first bit-stream reader 420 and the second bit-stream reader 425) for providing a bit-stream to each of the CPU 430 and the decoder 440 are required. In addition, the register buffer 435 is required for storing the register set previously generated by the CPU 430 for the next frame.

The CPU 430 may generate a register set corresponding to the next frame based on a result of parsing the header data included in the second bit-stream, and store a register set corresponding to the next frame in the register buffer 435. In other words, the CPU 430 may generate a register set by converting a result of parsing the header data included in the second bit-stream to fit the format required by the decoder 440, and store the generated register set in the register buffer 435.

After storing the register set corresponding to the next frame in the register buffer 435, the CPU 430 may wait until the decoder 440 completes decoding of the first bit-stream. When the decoder 440 completes decoding for the first bit-stream, the CPU 430 may set the register set stored in the register buffer 435 in the decoder 440 to perform decoding on the second bit-stream corresponding to the next frame. The decoder 440 may decode the second bit-stream based on the register set stored in the register buffer 435.

The output buffer 450 may store image data decoded by the decoder 440. For example, the output buffer 450 may store data related to an output image, such as pixel data. The above-described operations may be repeated in the decoding process for subsequent frames, and the CPU 430 and the decoder 440 may form a pipeline structure for processing an image sequence including a plurality of frames in frame order.

In addition, the video decoding apparatus 40 may be implemented as a system-on-chip (SoC) in which the CPU 430 and the decoder 440 are embedded. At least some of the remaining components included in the video decoding apparatus 40 may also be included in the SoC together with the CPU 430 and the decoder 440. The SoC may be a technology-intensive semiconductor in which the entire system is integrated into one chip. When devices with various functions are integrated into one chip, a product may be miniaturized and manufacturing cost may be reduced compared to separately manufacturing semiconductors with each function.

Figure 5:
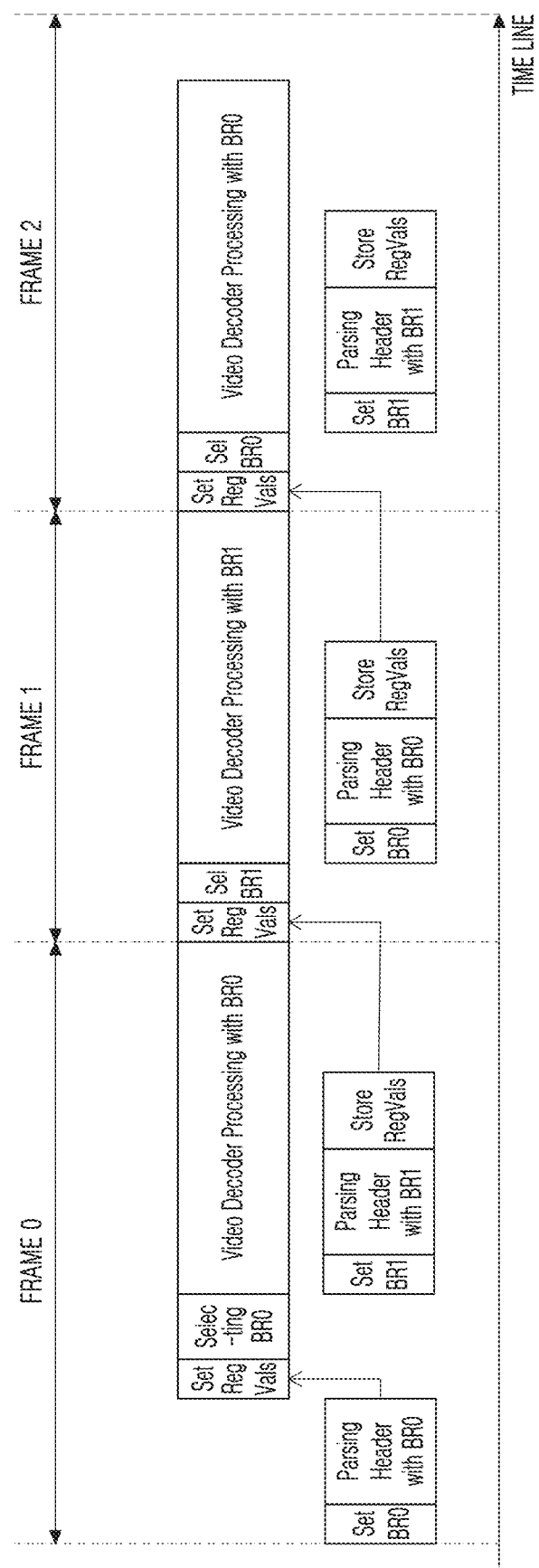
FIG. 5 is a diagram illustrating an overall operation process of the video decoding apparatus according to an example embodiment along a timeline.

FIG. 5 is a diagram illustrating an overall operation process of the video decoding apparatus according to an example embodiment along a timeline.

Referring to FIG. 5, an example of a process in which the video decoding apparatus (e.g., the video decoding apparatus 40 of FIG. 4) according to the inventive concepts performs decoding from the first frame (Frame 0) to the third frame (Frame 2) is shown.

In FIG. 5, "BR0" may correspond to the first bit-stream reader (e.g., the first bit-stream reader 420 of FIG. 4), and "BR1" may correspond to a second bit-stream reader (e.g., the second bit-stream reader 425 of FIG. 4).

In the cycle corresponding to the first frame (Frame 0), a bit-stream corresponding to the first frame (Frame 0) is set in the first bit-stream reader BR0, and operations from header parsing to video decoding processing may be sequentially performed. Up to this point, the operation of the video decoding apparatus according to the example embodiment of the inventive concepts is the same as the operation of the video decoding apparatus according to the related art described above with reference to FIG. 3.

However, the video decoding apparatus according to the inventive concepts, while the bit-stream corresponding to the first frame (Frame 0) is decoded by a decoder (e.g., the decoder 440 in FIG. 4), may parse header data on a bit-stream corresponding to the second frame (Frame 1). In other words, the video decoding apparatus according to the inventive concepts may perform a hardware operation by the decoder and a firmware operation by a CPU (e.g., the CPU 430 of FIG. 4) in parallel.

The firmware operation by the CPU may include an operation ("Set BR1") of setting a bit-stream corresponding to the second frame (Frame 1) in the second bit-stream reader, an operation ("Parsing Header with BR1") of parsing header data included in a bit-stream corresponding to the second frame (Frame 1), and an operation ("Store RegVals") that stores a set of generated registers based on the parsed header data.

When decoding of the first frame (Frame 0) is completed and the cycle corresponding to the second frame (Frame 1) begins, the CPU may set a set of pre-stored registers in the decoder ("Set RegVals"). In addition, the CPU may select the second bit-stream reader as the bit-stream reader that provides the bit-stream to the decoder ("Sel BR1"). Then, the decoder may directly perform decoding on the bit-stream corresponding to the second frame (Frame 1) ("Video Decoder Processing with BR1"). Therefore, in the cycle corresponding to the second frame (Frame 1), the same effect as omitting the operations ("Set BR1" and "Parsing Header with BR1") related to parsing of header data for the second frame (Frame 1) may be obtained.

Further, while the decoder decodes the bit-stream corresponding to the second frame (Frame 1), the CPU may perform a firmware operation on the bit-stream corresponding to the third frame (Frame 2) in parallel. For example, the CPU may perform an operation ("Set BR0" and "Parsing Header with BR0") of parsing header data included in the bit-stream corresponding to the third frame (Frame 2) and an operation ("Store RegVals") of storing a register set corresponding to a result of parsing the header data. Accordingly, in the cycle corresponding to the third frame (Frame 2), the same effect as omitting the operations ("Set BR1" and "Parsing Header with BR1") related to parsing of the header data included in the bit-stream corresponding to the third frame (Frame 2) may be obtained.

As such, according to the inventive concepts, while video decoding on the m-th frame (m is an arbitrary natural number), firmware operations on the m+1-th frame (such as header parsing and register set storage) are performed together, and thus, the same effect that the time for the firmware operation is omitted in the remaining frames except for the first frame of the video sequence may be obtained. Thus, processing time per frame and total video decoding time may be reduced.

Figure 6:
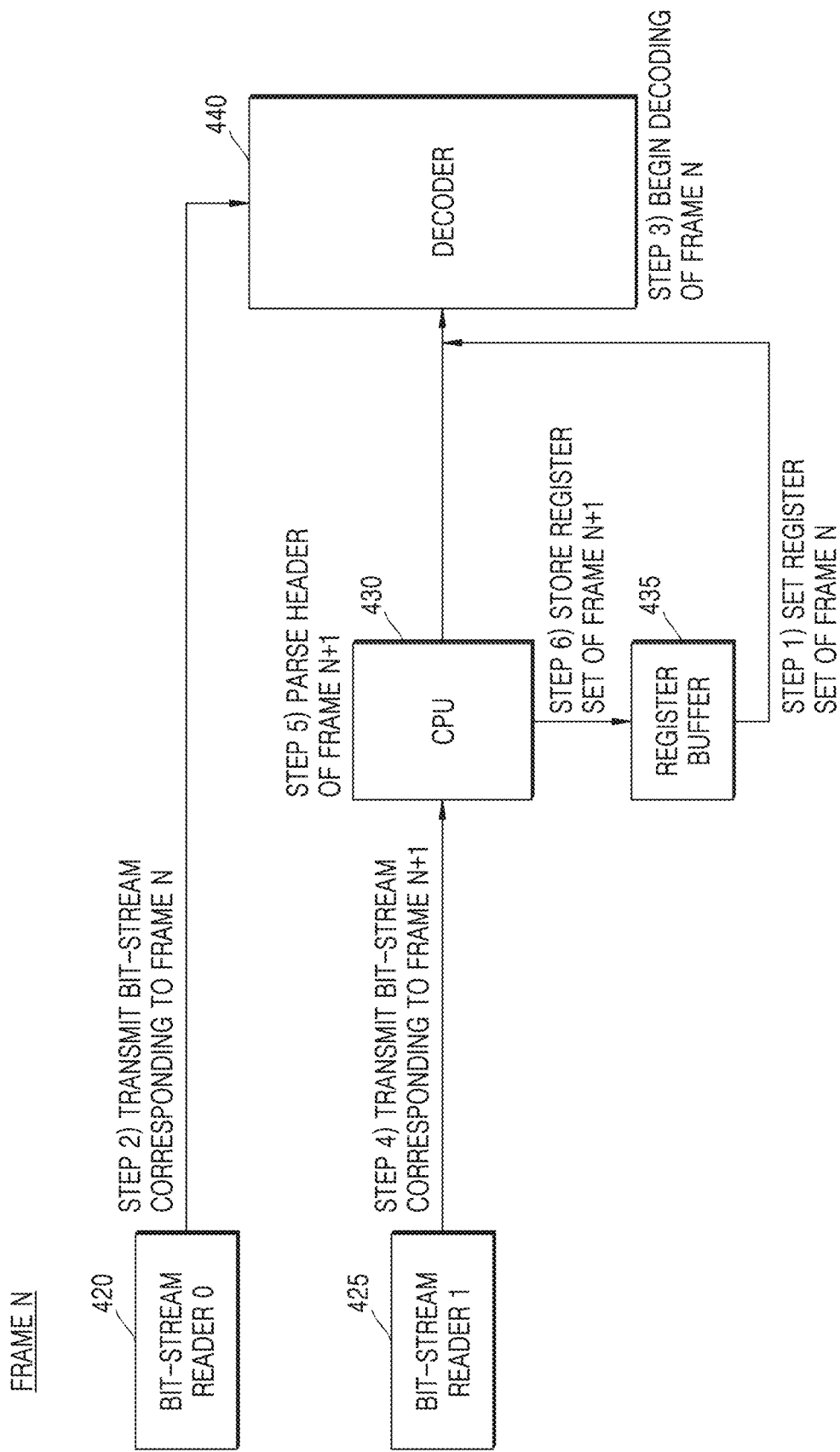
FIGS. 6 and 7 are diagrams for explaining operations performed by components of the video decoding apparatus of FIG. 4 in a process of decoding two consecutive frames.
Figure 7:
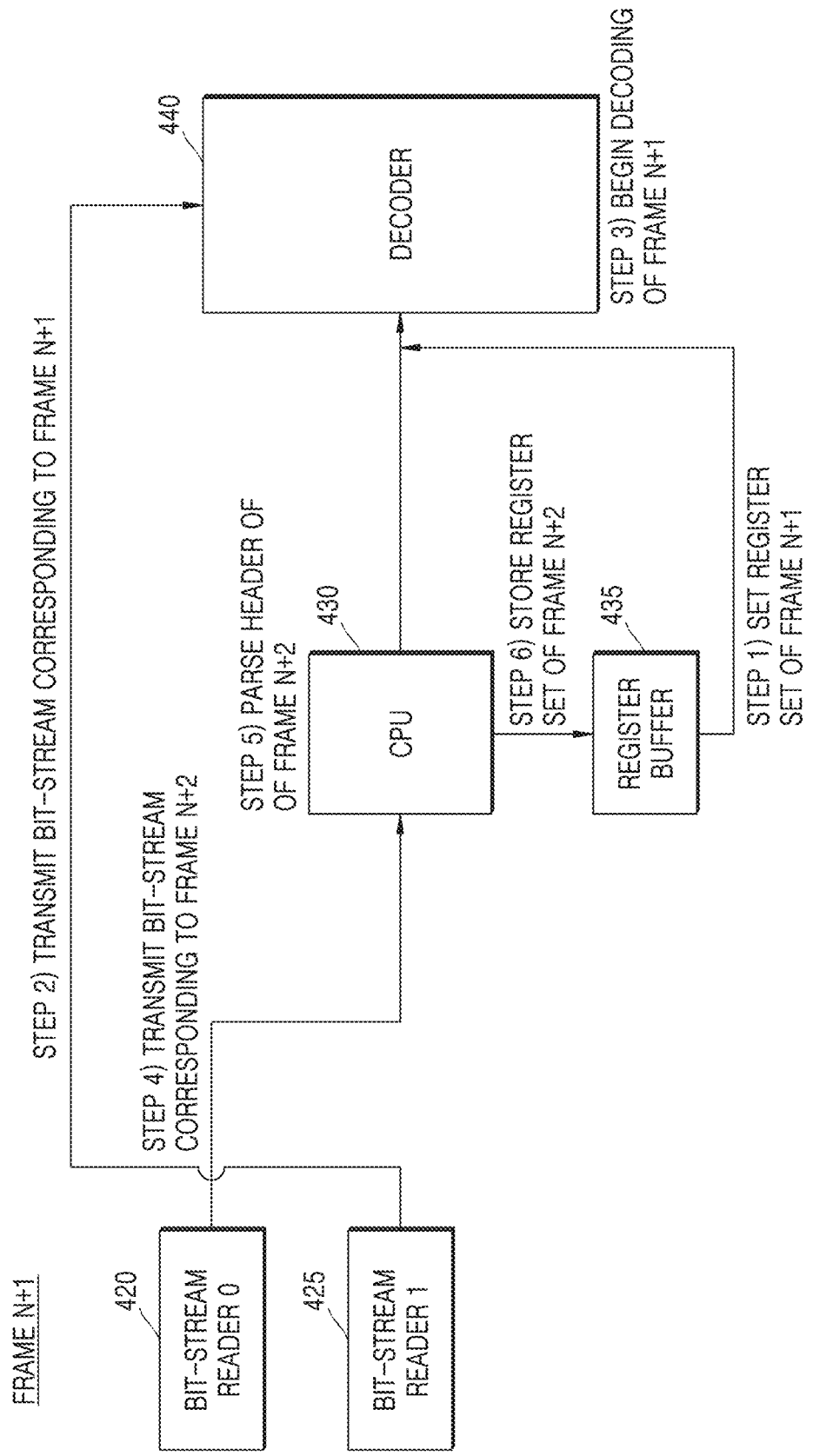

FIGS. 6 and 7 are diagrams for describing operations performed by components of the video decoding apparatus of FIG. 4 in a process of decoding two consecutive frames.

Referring to FIG. 6, operations of the components of the video decoding apparatus 40 in a cycle corresponding to Frame N are illustrated, and referring to FIG. 7, operations of components of the video decoding apparatus 40 in a cycle corresponding to Frame N+1 are illustrated.

Referring to FIG. 6, in STEP 1, the register buffer 435 may provide a register set for Frame N to the decoder 440. The operation of the register buffer 435 may be controlled by the CPU 430. The CPU 430 may set the register set for Frame N stored in the register buffer 435 in the decoder 440.

In step 2, the first bit-stream reader 420 may transmit a bit-stream corresponding to Frame N to the decoder 440. The operation of the first bit-stream reader 420 may be controlled by the CPU 430. In STEP 3, the decoder 440 may initiate decoding for Frame N. In addition, step 2 and step 3 may be sequentially performed. However, performing of step 2 and step 3 is not limited thereto, and step 2 and step 3 may be simultaneously performed. This is because the decoder 440 may perform decoding in real time while receiving the bit-stream from the first bit-stream reader 420 in units of bits.

In step 4, the second bit-stream reader 425 may transmit a bit-stream corresponding to Frame N+1 to the CPU 430. The operation of the second bit-stream reader 425 may be controlled by the CPU 430. On the other hand, step 3 and step 4 may be performed sequentially, but may be performed simultaneously.

In Step 5, the CPU 430 may perform a header parsing for Frame N+1. In addition, step 4 and step 5 may be performed sequentially. However, the performing of step 4 and step 5 is not limited thereto, and step 4 and step 5 may be performed simultaneously. This is because the CPU 430 may perform header parsing in real time while receiving the bit-stream in units of bits from the second bit-stream reader 425.

In step 6, the CPU 430 may store the register set for Frame N+1 in the register buffer 435. For example, the CPU 430 may store a register set corresponding to the result of header parsing for Frame N+1 in the register buffer 435. On the other hand, steps 4 to 6 may be performed within a period from when decoding of Frame N is started according to step 3 until decoding of Frame N is completed. In general, because the hardware operation time during decoding is longer than the firmware operation time, the CPU 430 may wait until the decoding of Frame N is completed after completing the operations of step 4 to step 6. However, the inventive concepts are not limited thereto, and step 4 may be started before the decoding of Frame N is completed, and step 6 may be completed together with the timing at which the decoding of Frame N is completed.

Referring to FIG. 7, in step 1, the register buffer 435 may provide the register set for Frame N+1 previously stored by step 6 of FIG. 6 to the decoder 440. The operation of the register buffer 435 may be controlled by the CPU 430. The CPU 430 may set the register set for Frame N+1, which has been stored in the register buffer 435, to the decoder 440.

In step 2, the second bit-stream reader 425 may transmit a bit-stream corresponding to Frame N+1 to the decoder 440. Because the second bit-stream reader 425 has already transmitted the bit-stream corresponding to Frame N+1 to the CPU 430 in the previous cycle, it may be more efficient to use the second bit-stream reader 425 instead of the first bit-stream reader 420 to transmit the bit-stream corresponding to Frame N+1 to the decoder 440 in the current cycle. The operation of the second bit-stream reader 425 may be controlled by the CPU 430.

In step 3, the decoder 440 may initiate decoding for Frame N+1. In addition, step 2 and step 3 may be performed sequentially. However, the performing of step 2 and step 3 is not limited thereto, and step 2 and step 3 may be performed simultaneously. This is because the decoder 440 may decode in real time while receiving bit-streams from the second bit-stream reader 425 in units of bits.

In step 4, the first bit-stream reader 420 may transmit a bit-stream corresponding to Frame N+2 to the CPU 430. The operation of the first bit-stream reader 420 may be controlled by the CPU 430. On the other hand, Step 3 and Step 4 may be sequentially performed, but may also be performed simultaneously.

In Step 5, the CPU 430 may perform a header parsing for Frame N+2. In addition, step 4 and step 5 may be performed sequentially. However, performing of step 4 and step 5 is not limited thereto, and step 4 and step 5 may be performed simultaneously. This is because the CPU 430 may perform header parsing in real time while receiving the bit-stream in units of bits from the first bit-stream reader 420.

In step 6, the CPU 430 may store a register set for Frame N+2 in the register buffer 435. In addition, steps 4 to 6 may be performed within a period from when decoding of Frame N+1 is started according to step 3 until decoding of Frame N+1 is completed. In general, because the hardware operation time is longer than the firmware operation time, the CPU 430 may wait until the decoding of Frame N+1 is completed after completing the operations of step 4 to step 6. However, the inventive concepts are not limited thereto, and step 4 may be started before the decoding of Frame N+1 is completed, and step 6 may be completed together with the timing at which the decoding of Frame N+1 is completed.

The video decoding apparatus 40 may repeat the operations shown in FIGS. 6 and 7 until decoding of the last frame included in the image sequence starts. Accordingly, the firmware operation time by the CPU 430 for each frame may be reduced, and the total video decoding time for one image sequence may be reduced.

Figure 8:
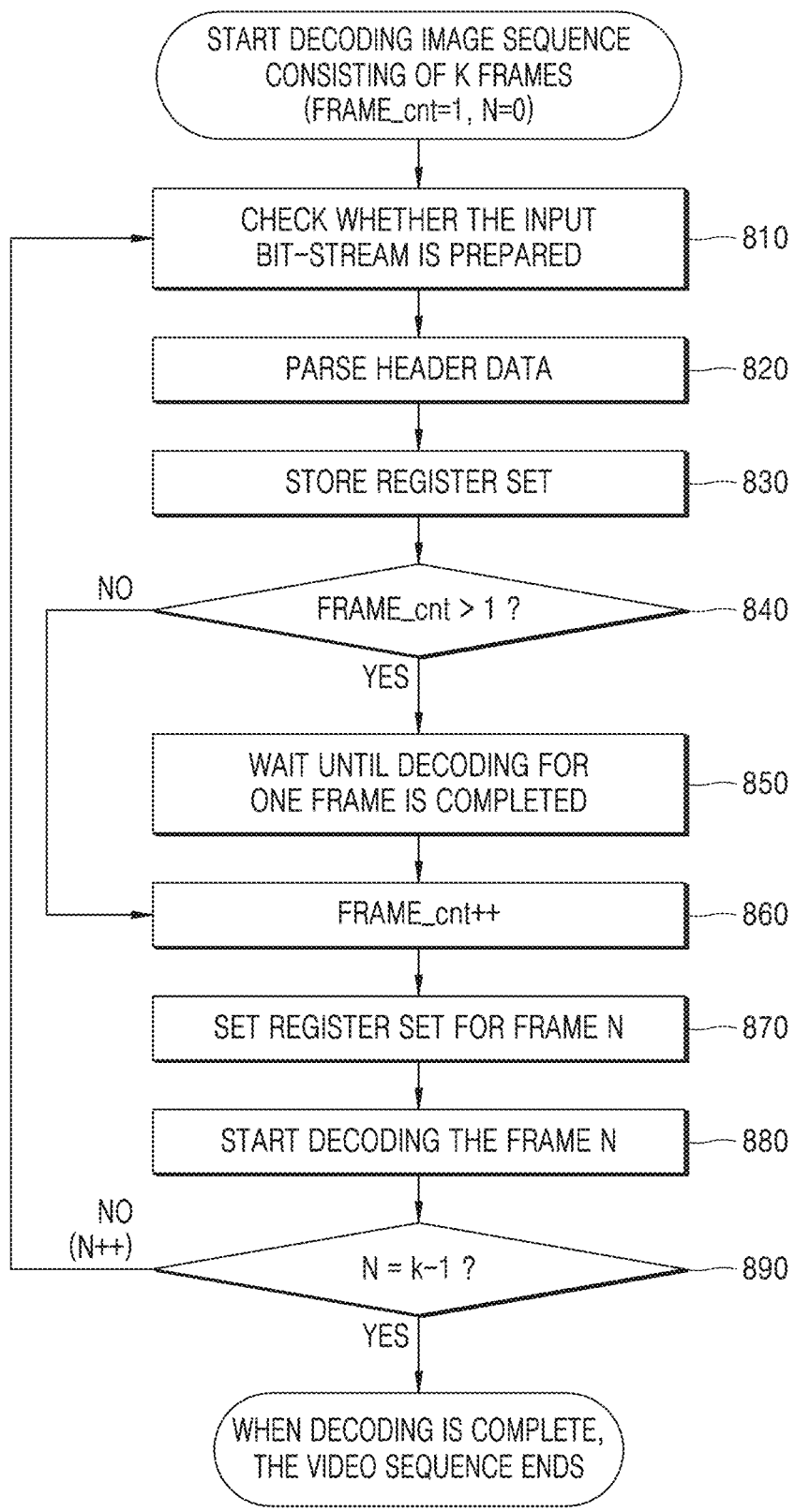
FIG. 8 is a diagram illustrating an example of an algorithm for decoding an image sequence by a video decoding apparatus according to an example embodiment.

FIG. 8 is a diagram illustrating an example of an algorithm for decoding an image sequence by a video decoding apparatus according to an example embodiment.

Referring to FIG. 8, an example of an algorithm used in a process by which the video decoding apparatus (e.g., the video decoding apparatus 40 of FIG. 4) decodes an image sequence composed of k frames (k is an arbitrary natural number) is shown. The algorithm of FIG. 8 is only one example for helping to understand and does not intend to limit the algorithm for implementing the operations of the video decoding apparatus described above with reference to FIGS. 4 to 7. Algorithms different from those of FIG. 8 may be used to implement the operations of the video decoding apparatus according to the present disclosure. In addition, the algorithm of FIG. 8 may be executed by a CPU (e.g., the CPU 430 of FIG. 4) included in the video decoding apparatus.

When decoding of the first frame is started, a variable "Frame_cnt" indicating the number of frames may have an initial value of 1, and a variable "N" indicating a frame ID may have an initial value of 0. However, the names or initial values of the corresponding variables are only examples and are not limited thereto. For example, N may have an initial value of 1. In addition, although two variables are used in the example of FIG. 8, when one variable is defined depending on a relationship with another variable, only one variable may be used.

In step 810, the video decoding apparatus may check whether the input bit-stream is prepared. For example, the video decoding apparatus may check whether an input bit-stream corresponding to the image sequence is prepared in the input buffer (e.g., the input buffer 410 in FIG. 4). When the input bit-stream is prepared, the video decoding apparatus may read the input bit-stream in units of frames by referring to the frame descriptor of the input buffer.

In step 820, the video decoding apparatus may parse the header data. For example, the video decoding apparatus may parse header data included in a bit-stream corresponding to one frame. A bit-stream reader (e.g., the first bit-stream reader 420 or the second bit-stream reader 425 of FIG. 4) may be used in a process in which the video decoding apparatus parses the header data.

In step 830, the video decoding apparatus may store a register set. The video decoding apparatus may generate a register set based on a result of parsing header data included in a bit-stream corresponding to one frame. The video decoding apparatus may combine a result of parsing the header data, convert the combined result into a register set, and store the register set in a register buffer (e.g., the register buffer 435 of FIG. 4).

In step 840, the video decoding apparatus may determine whether Frame_cnt is greater than 1. The video decoding apparatus may perform step 860 when Frame_cnt is less than or equal to 1 and may perform step 850 when Frame_cnt is greater than 1. A case in which Frame_cnt is 1 or less corresponds to a case in which Frame_cnt is an initial value of 1, and because a previously performed decoding operation does not exist in the first frame, step 850 may be omitted.

In step 850, the video decoding apparatus may wait until decoding for one frame is completed. For example, when Frame_cnt is greater than 1, because a previously performed decoding operation (e.g., a decoding operation for frame N−1) exists, the video decoding apparatus waits until the corresponding decoding operation is completed.

In step 860, the video decoding apparatus may increase the value of the Frame_cnt by 1. In step 870, the video decoding apparatus may set a set of registers for frame N. For example, when the image sequence decoding corresponds to the first loop or cycle of the algorithm shown in FIG. 8, the video decoding apparatus may set a register set for frame 0. In step 880, the video decoding apparatus may start decoding the frame N.

In step 890, the video decoding apparatus may determine whether N is equal to k−1. In other words, the video decoding apparatus may determine whether decoding of the k-th frame (i.e., the last frame) has started in step 880. When N is equal to k−1, the video decoding apparatus may end the image sequence when decoding of the current frame (i.e., the last frame) is completed, and when N is not equal to k−1, the video decoding apparatus may return to step 810 and repeat the loop or cycle. The video decoding apparatus may increase the value of N by 1 in the process of returning to step 810.

As described above, during a period after the decoding of one frame is started (step 890) and before the decoding of the corresponding frame is completed (step 850), operations according to steps 810 to 830 may be performed on the next frame. In other words, header parsing for a subsequent frame may be performed in parallel while decoding for a preceding frame among two consecutive frames is performed. Thus, because the time for the firmware operation is omitted for the remaining frames except for the first frame of the image sequence, the processing time per frame and the total video decoding time may be reduced.

Figure 9:
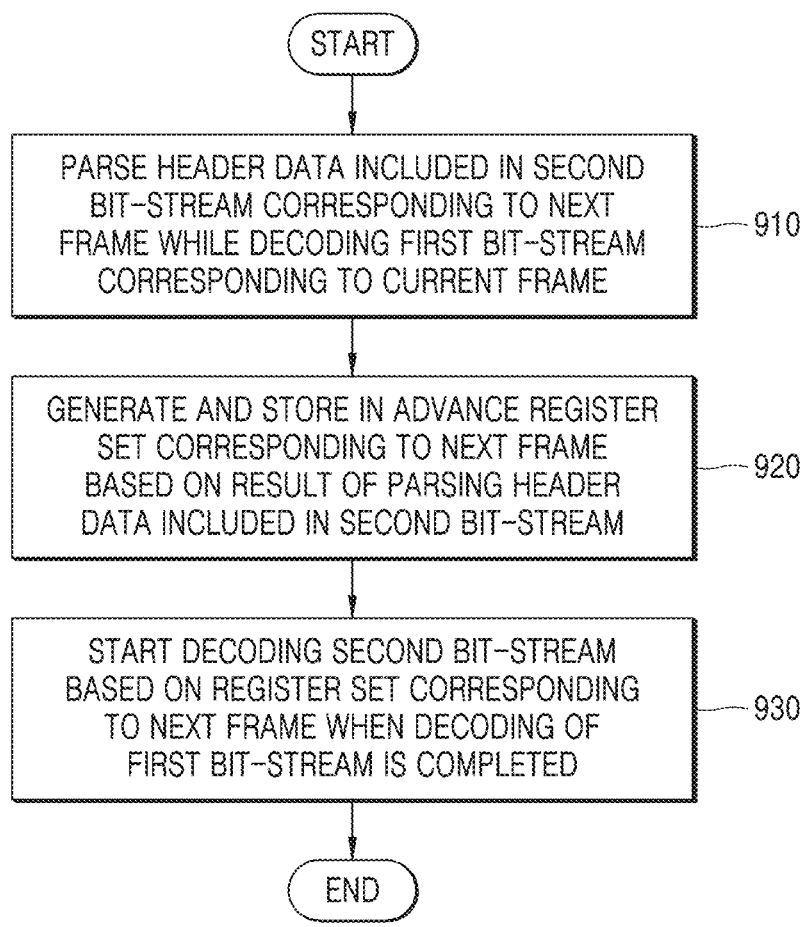
FIG. 9 is a flowchart illustrating a video decoding method according to an example embodiment.

FIG. 9 is a flowchart illustrating a video decoding method according to an example embodiment.

Referring to FIG. 9, the video decoding method consists of steps that are processed in the video decoding apparatus 40 of FIG. 4. Accordingly, it may be seen that the descriptions given above with respect to FIGS. 4 to 8 are also applied to the video decoding method shown in FIG. 9 even though the descriptions are omitted below.

In step 910, the video decoding apparatus, for example, video decoding device 40 of FIG. 4, may parse header data included in a second bit-stream corresponding to the next frame while decoding a first bit-stream corresponding to a current frame. For example, while a decoder included in the video decoding apparatus, for example, the decoder 440 in FIG. 4, performs decoding on the first bit-stream, a CPU included in the video decoding apparatus, for example, the CPU 430 in FIG. 4 may parse header data included in the second bit-stream.

On the other hand, in order to enable the decoder and the CPU to operate in parallel, the video decoding apparatus may read the first bit-stream in units of bits by using the first bit-stream reader (e.g., the first bit-stream reader 420 in FIG. 4) and provide the read first bit-stream to the decoder, and may read the second bit-stream in units of bits by using the second bit-stream reader (e.g., the second bit-stream reader 425) and provide the read second bit-stream to the CPU. However, the bit-stream reader providing bit-streaming to each of the decoders and CPUs is not fixed to one but can be changed for each frame.

In step 920, the video decoding apparatus may generate and store in advance a register set corresponding to the next frame based on a result of parsing header data included in the second bit-stream. After storing the register set corresponding to the next frame in the register buffer (e.g., the register buffer 435 in FIG. 4) using the CPU, the video decoding apparatus may wait until the decoder completes decoding of the first bit-stream.

In step 930, when decoding of the first bit-stream is completed, the video decoding apparatus may start decoding the second bit-stream based on a register set corresponding to the next frame. In order to perform decoding on the second bit-stream corresponding to the next frame, the video decoding apparatus may set a register set previously generated and stored in a register buffer in the decoder using the CPU.

Further, the video decoding apparatus, while decoding the second bit-stream corresponding to the next frame, may parse header data included in the third bit-stream corresponding to a frame subsequent to the next frame. As described above, the video decoding apparatus sequentially repeats the above-described operations with respect to frames included in the image sequence, thereby obtaining the same effect as omitting the time for the firmware operation in the remaining frames except for the first frame of the image sequence. As a result, the process time per frame and the total video decoding time may be reduced.

In addition, the video decoding method described above may be recorded in a computer-readable recording medium in which one or more programs including instructions for executing the method are recorded. Examples of the computer-readable recording medium include magnetic media such as hard disks, floppy disks and magnetic tape, optical media such as CD-ROMs and DVDs, magneto-optical media such as a floptical disk, and hardware devices specially configured to store and execute program instructions, such as ROM, RAM, flash memory, and the like. Examples of program instructions include not only machine language code such as those generated by a compiler, but also high-level language code that may be executed by a computer using an interpreter or the like.

Figure 10:
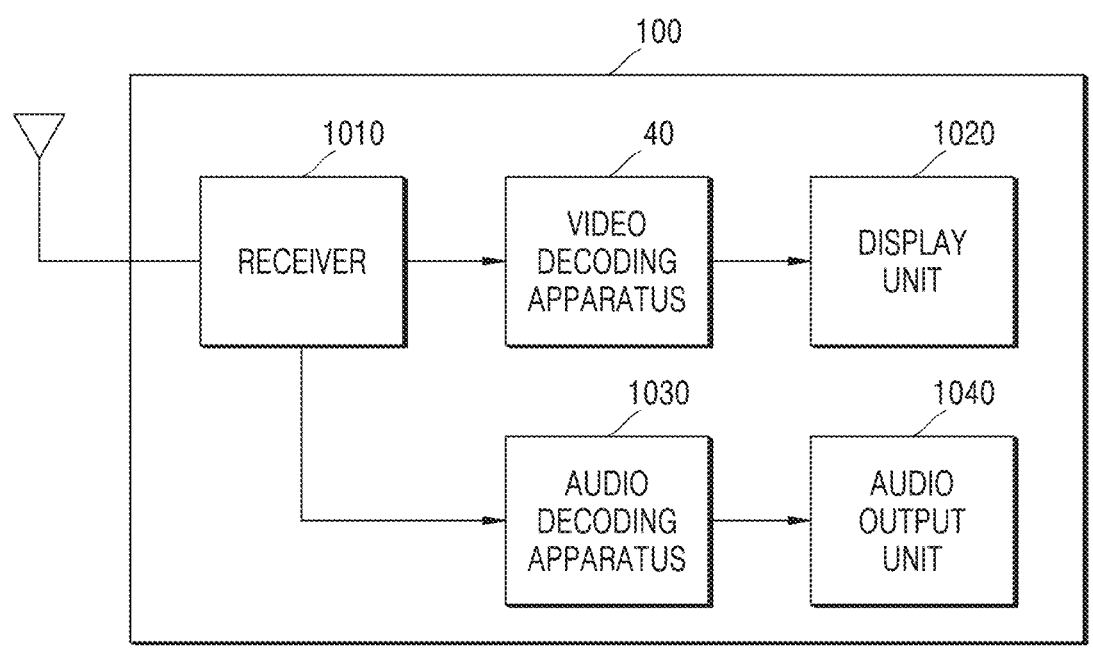
FIG. 10 is a block diagram illustrating a digital television (DTV) according to an example embodiment.

FIG. 10 is a block diagram illustrating a digital television (DTV) according to an example embodiment.

Referring to FIG. 10, the DTV 100 may further include a receiver 1010, a display unit 1020, an audio decoding apparatus 1030, and an audio output unit 1040, in addition to the video decoding apparatus 40 of FIG. 4. However, the DTV 100 is not limited thereto, and the DTV 100 may additionally include components other than those illustrated in FIG. 10. For example, the DTV 100 may further include a main CPU (not shown) for controlling the overall operation of the DTV 100 in addition to the CPU (e.g., CPU 430 in FIG. 4) included in the video decoding apparatus 40. In addition, the DTV 100 may further include RAM or ROM that temporarily or permanently stores programs, data, or instructions.

The DTV 100 may be implemented as a satellite DTV system, a cable DTV system, a handheld DTV system, or a terrestrial DTV system. In addition, the DTV 100 may include a TV system such as high-definition (HD), quad high-definition (QHD), ultra high-definition (UHD), and Samsung ultra high-definition (SUHD). The handheld DTV system may be implemented in a mobile telephone, a smartphone, a tablet PC, a vehicle navigation device, a personal digital assistant (PDA), or a portable multimedia player (PMP). However, the DTV is not limited thereto.

The receiver 1010 may receive an image signal transmitted from an external image transmission apparatus. The receiver 1010 may receive the image signal wirelessly, or may be connected to a cable or a set-top box to receive the image signal. The image signal may be a digital signal representing the input bit-stream. On the other hand, the image signal may include encoded information of input parameters required to decode the image signal together.

The video decoding apparatus 40 may perform decoding corresponding to a standard encoded by an external image transmission apparatus. For example, when the image signal is encoded to conform to the MPEG-2 standard, the video decoding apparatus 40 may perform decoding conforming to the corresponding standard. However, this is only an example, and the video decoding apparatus 40 may perform decoding based on various video coding standards including MPEG-1, MPEG-2, MPEG-4, H.263, H.264, H.265, and the like. The video decoding apparatus 40 may restore the encoded image signal to original image data by using decoding techniques such as variable length decoding, inverse discrete cosine transform (DCT), inverse quantization, and motion compensation considering spatiotemporal correlation.

The video decoding apparatus 40 may include a pipeline structure for reducing the total video decoding time, as described above with reference to FIGS. 4 to 9 in the process of decoding an image signal. The video decoding apparatus 40 may perform the firmware operation and the hardware operation in parallel using the pipeline structure, thereby saving time allocated for the firmware operation. Accordingly, the overall decoding time may be shortened.

The display unit 1020 may receive the image data decoded by the video decoding apparatus 40 and display the image data on the screen. For example, the display unit 1020 may be implemented as a liquid crystal display (LCD), a plasma display panel (PDP), a light emitting diode (LED) display, an organic LED (OLED) display, an active-matrix OLED (AMOLED) display, or a flexible display, but is not limited thereto.

On the other hand, the receiver 1010 may receive an audio signal together with an image signal, the audio decoding apparatus 1030 may decode the received voice signal, and the audio output unit 1040 may output decoded audio data through a speaker. Accordingly, a user may receive media content provided by an external image transmission device through the DTV 100.

At least some of the components of the DTV 100 shown in FIG. 10 may be implemented as an SoC. Components embedded in the DTV SoC may transmit and receive signals or data through a bus. On the other hand, DTV SoC may be equipped with a neural processing unit (NPU) and may utilize artificial intelligence design technology for image quality improvement and sound processing. The NPU may efficiently process large-scale computations using artificial neural networks. In addition, the NPU may perform deep learning by supporting simultaneous matrix operations.

In FIG. 10, the DTV 100 has been described as a representative example to which the video decoding apparatus 40 according to the inventive concepts is applied. However, the video decoding apparatus 40 according to the inventive concepts is not applied only to the DTV 100, but may be applied to all electronic devices that perform decoding on a digital image signal. For example, the electronic device may include a smartphone, a tablet, a personal computer (PC), personal digital assistants (PDA), a smart TV, a portable multimedia player (PMP), and the like.

Additionally, decoders 140, 440, bit-stream reader 120, first bit-stream reader 420, second bit-stream reader 425, and/or the components included therein may include processing circuitry such as hardware including logic circuits; a hardware/software combination such as a processor executing software; or a combination thereof. For example, the processing circuity may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A video decoding apparatus comprising:
   a central processing unit (CPU) including a reduced instruction set computer (RISC) that drives firmware and register sets each including a plurality of registers configured to store data, the CPU configured to parse first header data included in a first frame of a first bit-stream of an input bit-stream and configure a first register set of the register sets included in the CPU based on the parsed first header data; and
   a hardware decoder configured to decode the first bit-stream based on input parameters obtained through the first register set,
   wherein while the hardware decoder decodes the first bit-stream corresponding to the first frame of the input-bit stream, the CPU is configured to parse second header data included in a second bit-stream of the input bit-stream of a second frame subsequent to the first frame such that decoding of the first bit-stream and parsing of the second header data included in the second bit-stream are performed in parallel by different ones of the hardware decoder and the CPU.

2. The video decoding apparatus of claim 1, further comprising:
   a first bit-stream reader including processing circuitry configured to read the first bit-stream in units of bits and provide the read first bit-stream to the hardware decoder; and
   a second bit-stream reader including processing circuitry configured to read the second bit-stream in units of bits and provide the read second bit-stream to the CPU.

3. The video decoding apparatus of claim 2, wherein, in a second cycle before a first cycle, in which the first bit-stream reader provides the first bit-stream to the hardware decoder, the first bit-stream reader is configured to provide the first bit-stream to the CPU.

4. The video decoding apparatus of claim 2, wherein, in a second cycle following a first cycle, in which the first bit-stream reader provides the first bit-stream to the hardware decoder, the second bit-stream reader is configured to provide the second bit-stream corresponding to the second frame to the hardware decoder and the first bit-stream reader is configured to provide a third bit-stream corresponding to a third frame subsequent to the second frame to the CPU.

5. The video decoding apparatus of claim 2, further comprising:
   an input buffer configured to provide the input bit-stream to the CPU through at least one of the first bit-stream reader and the second bit-stream reader,
   wherein the input buffer includes a frame descriptor so that the CPU may read the input bit-stream in units of frames.

6. The video decoding apparatus of claim 1, further comprising:
   a register buffer,
   wherein the CPU is configured to configure a second register set of the register sets included in the CPU corresponding to the second frame based on a result of parsing header data included in the second bit-stream, and store data retrieved from the second register set corresponding to the second frame in the register buffer.

7. The video decoding apparatus of claim 6, wherein the CPU, after storing the data retrieved from the second register set corresponding to the second frame in the register buffer, is configured to wait until the hardware decoder completes decoding the first bit-stream.

8. The video decoding apparatus of claim 6, wherein the CPU is configured to send the data retrieved from the second register set stored in the register buffer to the hardware decoder to perform decoding on the second bit-stream corresponding to the second frame.

9. The video decoding apparatus of claim 1, further comprising:
   an output buffer configured to store image data decoded by the hardware decoder.

10. The video decoding apparatus of claim 1, wherein the video decoding apparatus is implemented as a system-on-chip (SoC) in which the CPU and the hardware decoder are embedded.

11. A video decoding method comprising:
while decoding a first bit-stream corresponding to a first frame including first header data using a hardware decoder, parsing second header data included in a second bit-stream corresponding to a second frame subsequent to the first frame using a central processing unit (CPU) that includes a reduced instruction set computer (RISC) that drives firmware and a register set having a plurality of registers configured to store data such that the decoding of the first bit-stream and the parsing of the second header data included in the second bit-stream are performed in parallel by different ones of the hardware decoder and the CPU;
configuring the register set corresponding to the second frame in advance based on a result of parsing header data included in the second bit-stream; and
starting decoding of the second bit-stream based on the register set corresponding to the second frame when decoding of the first bit-stream is completed.

12. The video decoding method of claim 11, further comprising:
parsing third header data included in a third bit-stream corresponding to a third frame subsequent to the second frame while decoding the second bit-stream corresponding to the second frame.

13. The video decoding method of claim 11, further comprising:
reading the first bit-stream in units of bits by using processing circuitry included in a first bit-stream reader and providing the first bit-stream to a hardware decoder; and
reading the second bit-stream in units of bits by using processing circuitry included in a second bit-stream reader and providing the second bit-stream to a central processing unit (CPU).

14. The video decoding method of claim 11, further comprising:
waiting to perform decoding on the second bit-stream corresponding to the second bit frame at a central processing unit (CPU) until decoding of the first bit-stream is completed.

15. The video decoding method of claim 11, further comprising:
setting the previously stored register set in a hardware decoder, using a central processing unit (CPU), to perform decoding on the second bit-stream corresponding to the second frame.

16. A video decoding apparatus comprising:
a hardware decoder configured to decode a first bit-stream;
a central processing unit (CPU) including a reduced instruction set computer (RISC) that drives firmware, the CPU configured to parse header data included in a second bit-stream; and
a plurality of bit-stream readers including processing circuitry configured to provide the first bit-stream and the second bit-stream to the hardware decoder and the CPU, respectively, such that decoding of the first bit-stream and parsing of header data included in the second bit-stream are performed in parallel by different ones of the hardware decoder and the CPU.

17. The video decoding apparatus of claim 16, wherein the first bit-stream and the second bit-stream correspond to each of two consecutive frames.

18. The video decoding apparatus of claim 16, wherein the CPU and the hardware decoder form a pipeline structure for processing an image sequence including a plurality of frames in frame order.

19. The video decoding apparatus of claim 16, further comprising:
a register buffer,
wherein the CPU includes a register set having a plurality of registers configured to store data, the CPU is configured to,
configure the register set by converting a result of parsing header data included in the second bit-stream to fit a format required by the hardware decoder, and
store data retrieved from the register set in the register buffer.

20. The video decoding apparatus of claim 19, wherein the hardware decoder is configured to decode the second bit-stream based on the data retrieved from the register set stored in the register buffer.

* * * * *